(12) United States Patent
Loce et al.

(10) Patent No.: US 6,975,778 B1
(45) Date of Patent: Dec. 13, 2005

(54) METHOD AND SYSTEM TO ADJUST FOR IMAGE ERRORS INDUCED BY A LENS ARRAY

(75) Inventors: Robert P. Loce, Webster, NY (US); Beilei Xu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/559,198

(22) Filed: Apr. 27, 2000

(51) Int. Cl.$^7$ ............................................. G06K 9/40
(52) U.S. Cl. ................. 382/275; 382/260; 358/3.06; 101/485
(58) Field of Search ............... 382/254, 255–260, 382/261, 262, 263, 264, 265, 266, 268, 270, 382/274–276, 100, 104, 156, 169, 178, 193, 382/195, 206, 154, 305, 310, 317–321, 140; 348/606–609, 348/627, 687; 358/447, 3.06–3.09, 679, 461; 359/679; 355/18; 101/485

(56) References Cited

U.S. PATENT DOCUMENTS

| | | | | |
|---|---|---|---|---|
| 4,741,045 A | * | 4/1988 | Denning | 382/178 |
| 4,950,862 A | * | 8/1990 | Kajikawa | 219/121.68 |
| 4,961,117 A | * | 10/1990 | Rumley | 358/461 |
| 5,719,680 A | * | 2/1998 | Yoshida et al. | 358/296 |
| 5,832,139 A | * | 11/1998 | Batterman et al. | 382/291 |
| 5,898,790 A | * | 4/1999 | Laurence | 382/100 |
| 5,914,819 A | * | 6/1999 | Kondo et al. | 359/679 |
| 5,942,745 A | * | 8/1999 | Kline et al. | 250/208.1 |
| 6,101,283 A | * | 8/2000 | Knox | 382/254 |
| 6,158,345 A | * | 12/2000 | Gelbart | 101/485 |
| 6,456,397 B1 | * | 9/2002 | Chase et al. | 358/3.26 |

* cited by examiner

Primary Examiner—Daniel Miriam
Assistant Examiner—Seyed Azarian
(74) Attorney, Agent, or Firm—Fay, Sharpe, Fagan, Minnich & McKee, LLP

(57) ABSTRACT

An imaging apparatus includes an image acquisition section which converts a physical image to a digital image representation using non-ideal optics such as an array lens. This image acquisition results in a digital image representation containing errors or artifacts. A memory in data communication with a processor stores a plurality of compensation parameters selected for use in correcting errors induced by the lens array. The compensation parameters are determined by performing a lens characterization which includes measuring lens performance at a plurality of locations along the lens. After the processor adjusts the image representation, the post-compensated digital image representation may be further processed, stored, transferred, and the like. According to another embodiment of the invention, a non-ideal array lens induces errors in an image representation during a printing or output operation. Similarly, an image processor applies pre-compensation parameters to the desired or ideal image representation in electronic form to compensate for errors which are known to be induced by the lens during the output operation. Accordingly, when the pre-compensated image representation is output using the non-ideal lens, the physical image output appears to have been printed with an ideal lens.

11 Claims, 2 Drawing Sheets

FIG. 2
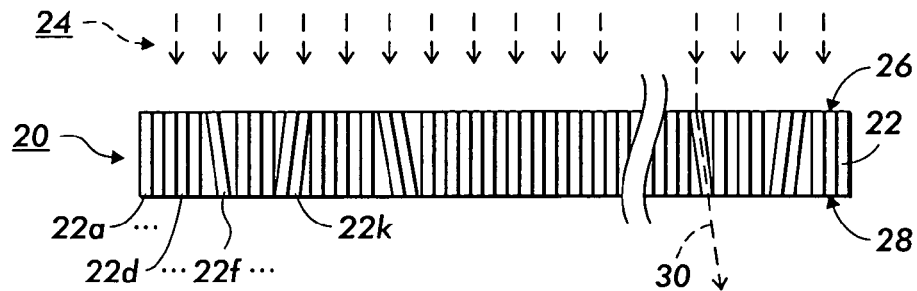
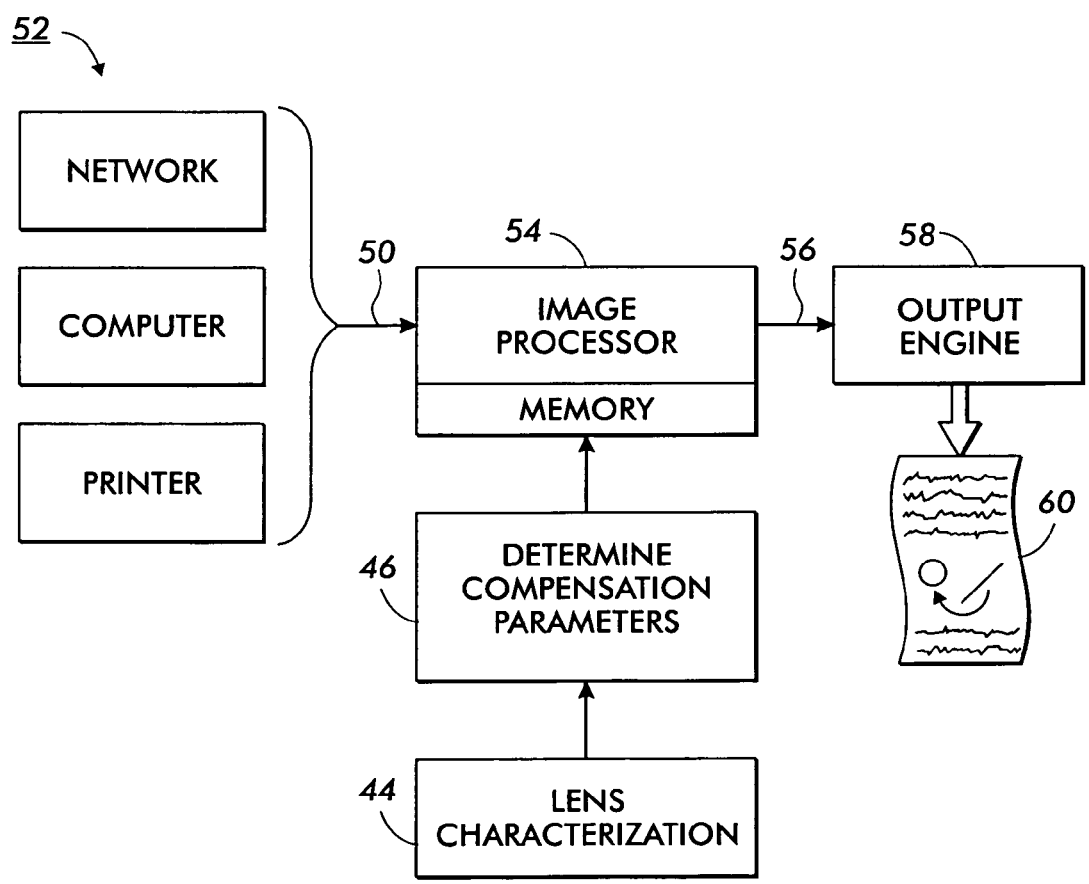
FIG. 3

METHOD AND SYSTEM TO ADJUST FOR IMAGE ERRORS INDUCED BY A LENS ARRAY

BACKGROUND OF THE INVENTION

This invention generally relates to the art of digital imaging. The invention finds particular application in adjusting for image errors or artifacts induced by a lens array employed to either scan physical images into an image representation, or to output image representations onto physical media. It is to be appreciated however, that the present invention finds further application in other imaging devices with spatially varying error or artifact functions.

Image acquisition devices, such as scanners, and image output devices such as printers or copying machines, typically employ a lens mechanism to either transfer a physical image onto a photo sensitive surface in the case of an image input or scanning device, or transfer a digital image representation onto a hard copy or physical output media.

Indeed, certain optical systems used in image reading or writing possess a spatially varying point-spread-function (PSF). An example is the local blurring and image doubling that occur due to tilted rods in a Selfoc® lens array. This local PSF effect can cause severe streak artifacts in scanned and printed images, particularly halftone images. In many input scanners, scan bars are rejected due to this problem. This defect and other array lens defects vary across the field, hence, a restoration or pre-compensation based on the traditional assumption of a spatially uniform PSF do not yield satisfactory results.

present invention contemplates an improved method and apparatus to correct or adjust for errors in an optical system using image post-acquisition and pre-output techniques which overcome the above-referenced problems and others.

SUMMARY OF THE INVENTION

In accordance with one embodiment of the present invention, a method of altering an image representation to adjust for artifacts attributable to an array lens include obtaining a characterization for the array lens. From the characterization, compensation parameters are determined for a plurality of locations across the array lens and these determined parameters are stored.

In accordance with another present invention, the artifacts attributable to the array lens are induced during image scan using the array lens. This results in an electronic image representation which contains the artifacts. The method further includes applying the compensation parameters to the electronic image representation including the artifacts, which results in a post-compensated electronic image representation.

In accordance with another aspect of the present invention, the artifacts attributable to the array lens are induced during image output using the array lens. The method further includes applying the compensation parameters to an electronic image representation without the artifacts, or a desired electronic image representation. This results in a pre-compensated electronic image representation.

In accordance with another aspect of the present invention, the characterization step includes measuring optical performance of the array lens at a plurality of locations across the array lens and/or estimating optical performance of the array lens at a plurality of locations across the lens.

In accordance with another aspect of the present invention, the method further includes applying the compensation parameters to the image representation with an iterative restoration method such as the Maximum Likelihood-Expectation Maximization method (ML-EM), sharpening filters, windowed-wiener spectrum technique, and spatial convolution.

In accordance with another embodiment of the present invention, an imaging apparatus includes a plurality of light sources and an array lens which focuses emitted light onto a desired receptor. A memory is also included which stores a plurality of parameters used to compensate for artifacts which are induced by the array lens, and a processor which applies the compensation parameters to the image representation resulting in a compensated image representation.

In accordance with another aspect of the present invention, the imaging apparatus employs the array lens to acquire an image representation from a physical image. Thus, artifacts are induced in the image representation to which a processor applies the compensation parameters resulting in a post-compensated image representation.

In accordance with another aspect of the present invention, the imaging apparatus employs the array lens to produce a physical image from a desired image representation. The processor applies the compensation parameters to the desired image representation which results in a pre-compensated image representation suitable for output by an apparatus including the array lens.

In accordance with another aspect of the present invention, the array lens includes a plurality of adjacent rods arranged in a one-dimensional array and/or a plurality of adjacent rods arranged in a two-dimensional array.

In accordance with another embodiment of the present invention, a digital imaging method includes determining an error attributable to at least one selected coordinate on an array lens. A physical image is then scanned using the array lens with the determined error, which results in an image representation including the error or artifacts. The determined error in the scanned physical image is then compensated for which results in a post-compensated image representation.

In accordance with another aspect of the present invention, the determining an error step includes measuring errors induced by the array lens at selected locations relative to the array lens.

In accordance with another aspect of the present invention, the compensating step includes altering the image representation to adjust spatially varying errors induced by the array lens.

In accordance with another embodiment of the present invention, a digital imaging method includes determining an error attributable to at least one selected coordinate on an array lens. A desired image representation is then received and the determined error is compensated for resulting in a pre-compensated image representation. The pre-compensated image representation is then output onto a physical media.

In accordance with another aspect of this embodiment of the present invention, the determining an error step includes measuring errors induced by the array lens at selected locations relative to the array lens.

In accordance with another aspect of this embodiment of the present invention, the compensating step includes altering the image representation to adjust for spatially varying errors induced by the array lens.

One advantage of the present invention resides in the correction of errors induced by an array lens during image acquisition and/or image output.

Another aspect of the present invention resides in the ability to restore scanned images, and/or pre-compensate for output images according to errors induced by an array lens, or other spatially varying neighborhood effects.

Still other advantages of the present invention will become apparent to those of ordinary skill in the art upon reading and understanding the following detailed description of the preferred embodiments.

BRIEF DESCRIPTION OF THE DRAWINGS

The invention may take physical form in certain parts and arrangements of parts, and in certain steps and arrangements of steps. The drawings are only for purposes of illustrating the preferred embodiments and are not to be construed as limiting the invention.

FIG. 2 is a side elevational view of a one-dimensional array lens; and,

FIG. 3 is is a functional block diagram of an apparatus suitable to practice another embodiment of the present invention.

DETAILED DESCRIPTION OF THE PREFERRED EMBODIMENTS

Figure 1:
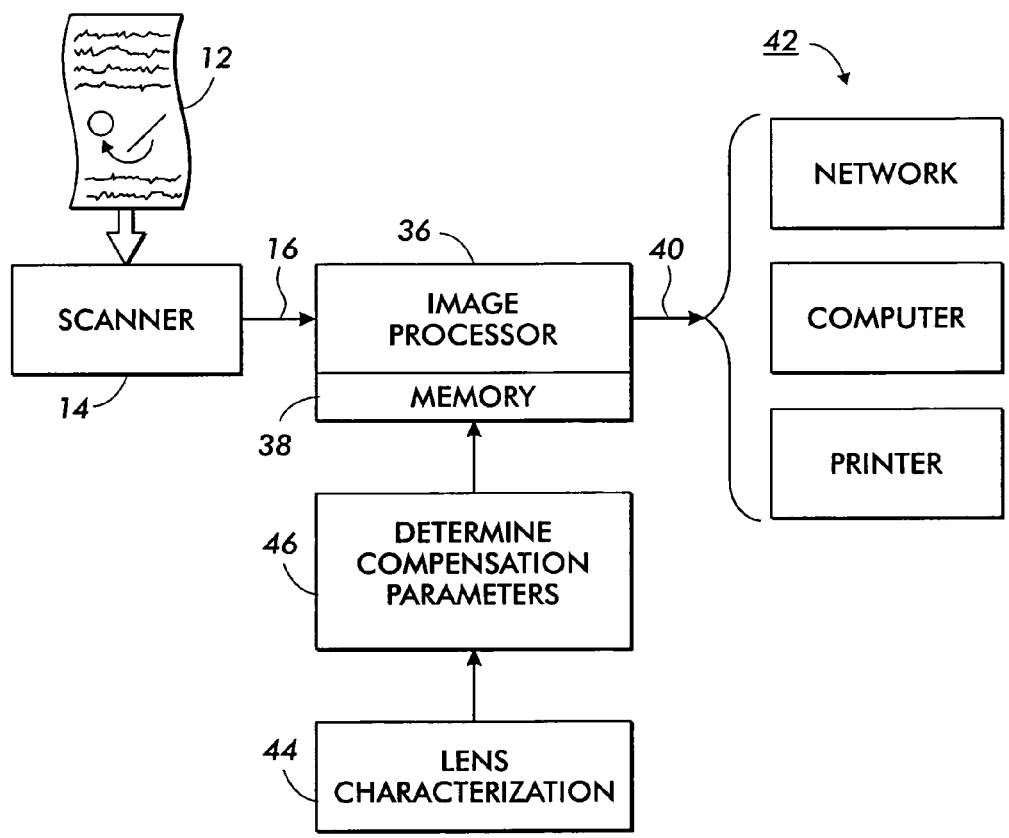
FIG. 1 is a functional block diagram of an imaging apparatus suitable to practice an embodiment of the present invention.

With reference to FIG. 1, an imaging apparatus is illustrated which compensates for artifacts or errors introduced during the acquisition of a physical document 12 into electronic format. An exemplary method to acquire or convert a physical image or hard copy 12 to a digital image representation is to employ a scanner 14 or the like. Typically, scanner 14 includes an array lens, conventional optics, or other light focusing devices. Because the optics employed in scanners are typically imperfect, errors or artifacts are induced during conversion or acquisition of the physical image 12 as a digital image representation 16.

An exemplary array lens 20 is illustrated in FIG. 2. The array lens includes a plurality of small rods 22 disposed adjacent to one another in a line. Typically, the rods 22 are formed from glass or fiber optic cable and the like. During use, the lens is used to focus or direct light 24 from one side of the lens 26 to the other 28. Particular attention to individual rods 22*f* and 22*k* illustrate an imperfection in the array 20. That is, at times the individual rods are not disposed in a perpendicular arrangement within the lens and can cause light 24 to appear transposed on the output side 28 of the array lens. This artifact or error is best illustrated by dashed line 30 indicating the path a particular light beam travels through the array. While the array lens 20 illustrated includes a single row of rods those skilled in the art will recognize that typical "one-dimensional" arrays often employ several rows of closely spaced rods. The "one-dimensional" name refers here to the object plane or target area intended to be observed or imaged with the lens. Similarly, but not illustrated, a "two-dimensional" array employs multiple rows of rods, with the "two-dimensional" name referring to the two-dimensional object plane or target area to be observed or imaged.

Referring back to FIG. 1, the image representation containing artifacts 16 is forwarded from the scanner 14 to an image processor 36. As will be more thoroughly discussed below, image processor 36 generally proceeds to a specified image location, for example a target pixel within the image representation, and then performs a restoration operation. The restoration operation for any particular pixel is retrieved from memory 38 and, when applied to the image representation 16 yields an estimate of the image as if it were scanned with idealized optics producing a nominal uniform error such as a preferred point spread function. The restoration operation employs neighboring pixels about the target pixel in determining the restored value. Following the compensation by the processor 36, a post-compensated digital image representation 40 is output for further manipulation, storage, or distribution or the like as exemplified by the illustrated devices 42.

Memory 38 is loaded with compensation parameters determined, for example, by performing a lens characterization or performance measurement 44 on the array lens 20. An exemplary lens characterization employs classical modulation transfer function (MTF) measurement and/or estimation techniques sampled across the field of the array lens. For example, image scans may be obtained of an edge, line, point, and/or a periodic pattern. Alternately, whole field characterizations may be accomplished using speckle techniques, and/or periodic objects such as "on and off" lines at different spatial frequencies. Moreover, those skilled in the art will appreciate that the lens characterization 44 can be accomplished in a variety of locations, such as in an assembly plant prior to delivery to a customer, in a refurbishing shop, or in the field, i.e. at a user's location.

From the characterization 44, parameters are determined 46 according to the specific compensation method in use by the image processor 36. For example, point spread function (PSF) parameters at various locations along the array lens are extracted for the Maximum Likelihood-Expectation Maximization (ML-EM) method, Modulation Transfer Function (MTF) parameters are extracted for the windowed wiener spectrum method, and a wide variety of sharpening filter coefficients are extractable such as linear, non-linear and the like. Once these parameters are determined, they are forwarded to the memory 38 for access by the image processor as discussed above.

Specifically, a digital image F''' digitized by an input scanner can be represented as an ideal digital image F that has been imaged by a "convolution" process PSF(i,j;i,j), where PSF denotes the Point Spread Function of an imaging system that can vary with location (i,j):

$$F'''(i, j) = \sum_{i',j'} F(i' - i, j' - j) PSF(i', j'; i, j) \quad (1)$$

For an ideal scanner, PSF is constant across the imaging field, i.e. PSF(i,j; i,j)=$PSF_{ideal}$(i,j) for all i and j. In this case, conventional image restoration techniques, such as Wiener filtering technique, can be suitably applied to estimate the original documents from the scanned images. However, if there are defects in the system, such as a tilted rod in a Selfoc® lens array, PSF(i,j;i,j) may vary with I and j. In general, PSF(i,j;i,j) can be represented by two components within another nonlocal "convolution" process as shown by Eq. (2):

$$PSF(i, j; i, j) = \sum_{i',j'} PSF_{ideal}(i' - i, j' - j) PSF_{sv}(i', j'; i, j) \qquad (2)$$

where $PSF_{ideal}$ is the uniform component and $PSF_{sv}$ denotes a spatially varying component.

Those skilled in the at will appreciate that the techniques more fully explained below is capable of correcting for both of the effects simultaneously. Note that the variation in $PSF_{sv}$ due to defects in a Selfoc® lens array typically appears only in the fast scan direction (i). Hence, in the typical scenario of interest PSF can be rewritten as $$PSF(i,j;i,j) = PSF(i,j;i) \qquad (3)$$

To better understand the spatially varying nature of this nonlogical "convolution" process, consider an example where $PSF_{sv}$ can be characterized by a Gaussian distribution. For this example, according to Eq. (3), the standard deviation of the Gaussian varies with the fast scan location of the distribution (location i). The equations below show the relationship between the actual scanned image F" ideal scanned image F', , and component point spread functions. Equation (4) shows the nonlocal "convolution" process relating F" with F'.

$$F''(i, j) = \sum_{i',j'} F'(i' - i, j' - j) PSF_{sv}(i', j'; i) \qquad (4)$$

Equation (5) shows the conventional convolution process relating F' with F".

$$F'(i,j) = F(i,j) \otimes PSF_{ideal}(i,j) \qquad (5)$$

Artisans will recognize that other defects might also yield spatially varying PSF. For example, when the scanning bars are not parallel to the platen surface or when an object is not placed in close contact with the scanning surface (e.g. bound book, wrinkled sheets, and 3D objects), PSF also varies with spatial location. When a spatially varying PSF is present, a correction method based on a uniform PSF might produce images with artifacts due to over-or under-corrections.

As an example of a specific lens characterization and compensation parameter determination, a spatially varying PSF is obtained as follows. We assume the spatially varying PSF of a system is generally constant over time or varying at such a rate that a sensing or re-calibration can be suitably performed.

There are two general approaches to obtain the spatially varying PSF: the use of an imaging model of the system to predict the PSF at a point; or a calibration procedure. Alternately, a combination of a calibration procedure and an imaging model can be employed. The following image measurement-based method is exemplary:

Position a fine line in the object plane of an array lens (such as those manufactured under the trademark 'Selfoc') scanner perpendicular to the array length;

Scan the image plane with a slit detector to obtain the local line spread function;

Repeat the above process for all positions of interest in the imaging field;

Rotate the line and slit in the opposite direction, and repeat the above process.

If an effect is periodic, such as the nominal variation along the array lens when it is defocused, one can acquire data for one period of the effect and use it when operating on all periods.

The general methodology at this step is that an algorithm would first proceed to an image location (target pixel). Then a restoration operation suitable for that location is performed. The restoration yields an estimate of the image as if it was scanned with idealized optics producing a nominal uniform preferred PSF. The restoration operation employs neighboring pixels about that target pixel in determining the restored value of the pixel. For example, the operation could be like a "local convolution," or other local restoration method. Equation (6) shows this operation abstractly.

$$\tilde{F}'(i,j) = F(i,j) \otimes_i RES(i,j;i) \qquad (6)$$

where $\tilde{F}'(i,j)$ is the estimate of the image at point (i,j) as if it were scanned with idealized optics producing nominal uniform preferred PSF; $_i$ is a local neighborhood operation about pixel i (similar to a local convolution); and RES (i, j; i) is a restoration kernel that contains processing coefficients or information for restoration about pixel i. Below, we show a specific local restoration process which effectively corrects image doubling artifacts like those encountered with Selfoc® tilted rods.

Iterative ML-EM Restoration Method

To compensate for the spatially varying PSF, it is desirable to develop an image restoration technique that can directly incorporate this PSF into its operation. Also, the method should work well in an image doubling setting, such as one might encounter with array lens tilted rods. One such method is the Maximum Likelihood-Expectation Maximization method (ML-EM) as shown by $$\tilde{F}'^{(k+1)}(i, j) = \tilde{F}'^{(k)}(i, j) \sum_{t,s} \frac{\tilde{F}''(t-i, s-j) PSF_{sv}(t, s; i)}{\sum_{m,n} \tilde{F}'^{(k)}(m-t, n-s) PSF_{sv}(m, n; i)} \qquad (7)$$

where $\tilde{F}'^{(k+1)}$ is the estimate at the (k+1) iteration, and the operation is being performed about pixel i as seen in the $PSF_{sv}$ distribution.

With reference now to FIG. 3, an imaging apparatus is shown to pre-compensate a digital image representation prior to outputting where the output engine employs non-ideal optics. A digital image representation 50 is created or retrieved from a digital image source 52. At this point the image representation is error free, that is, it does not include artifacts. Image processor 54 applies pre-compensation parameters to the desired digital image representation 50 to produce a pre-compensated image representation 56. In other words, the image processor 54 applies an inverse of the errors or artifacts expected to be induced later during image output. The pre-compensated image representation 56 is then forwarded to an output engine 58 which includes non-ideal optics such as a lens array 20 (FIG. 2). The physical output 60 thus appears to have been printed on an ideal or error free output terminal.

Those skilled in the art will appreciate that in some instances pre-compensation processing occurring in processor 54 will require producing or applying negative values to the pre-compensated image representation 50. These negative values can be implemented in an offset gain system, or alternately they may be truncated with the errors diffused locally via an error diffusion method.

The invention has been described with reference to the preferred embodiments. Modifications and alterations will naturally occur to others upon reading and understanding the preceding detailed description. It is intended that the invention be construed to include all such modifications and alterations insofar as they come within the scope of the appended claims or the equivalents thereof.

Having thus described the invention, we claim:

1. A method of altering an image representation to adjust for artifacts attributable to an array lens, the method comprising:

obtaining a characterization at selected locations across the array lens;

from the characterization, determining compensation parameters for a plurality of locations across the array lens;

storing the determined compensation parameters; and applying the compensation parameters to the image representation with an iterative restoration method selected from the set of ML-EM method, sharpening filters, windowed-wiener spectrum technique and spatial convolution.

2. The method as set forth in claim 1, wherein the artifacts attributable to the array lens are induced during image scan using the array lens, resulting in an electronic image representation including the artifacts, the method further comprising:

applying the compensation parameters to the electronic image representation including the artifacts, resulting in a post-compensated electronic image representation.

3. The method as set forth in claim 1, wherein the artifacts attributable to the array lens are induced during image output using the array lens, the method further comprising:

applying the compensation parameters to an electronic image representation without the artifacts, resulting in a pre-compensated electronic image representation.

4. The method as set forth in claim 1, wherein the obtaining a characterization step comprises:

measuring optical performance of the array lens at a plurality of locations across the array lens.

5. The method as set forth in claim 1, wherein the obtaining a characterization step comprises:

estimating optical performance of the array lens at a plurality of locations across the array lens.

6. The method as set forth in claim 1, wherein the obtaining a characterization step comprises:

measuring optical performance of the array lens at at least one location on the array lens; and estimating optical performance of other locations on the array lens based on the measurements.

7. An imaging apparatus comprising:

at least one light source;

an array lens, facing in a direction of the light source, which focuses emitted light from the light source onto a desired receptor, said array lens including a plurality of neighboring lens elements disposed with respect to one another transverse to the direction in which the array lens faces, the array lens inducing artifacts in an image representation on the receptor;

a memory which stores a plurality of parameters to compensate for the array lens induced artifacts; and a processor which applies the compensation parameters, resulting in a compensated image representation, said processor applying the compensation parameters to the image representation with an iterative restoration method selected from the set of ML-EM method, sharpening filters, windowed-wiener spectrum technique and spatial convolution.

8. The imaging apparatus as set forth in claim 7, wherein:

the imaging apparatus employs the array lens to acquire an image representation from a physical image, thereby inducing artifacts in the image representation, and the processor applies the compensation parameters to the image representation including the artifacts, resulting in a post-compensated image representation.

9. The imaging apparatus as set forth in claim 7, wherein:

the imaging apparatus employs the array lens to produce a physical image from a desired image representation, and the processor applies the compensation parameters to the desired image representation, resulting in a pre-compensated image representation.

10. The imaging apparatus as set forth in claim 7, wherein the array lens comprises a plurality of adjacent rods arranged in a one-dimensional array.

11. The imaging apparatus as set forth in claim 7, wherein the array lens comprises a plurality of adjacent rods arranged in a two-dimensional array.

* * * * *